Figure 1:
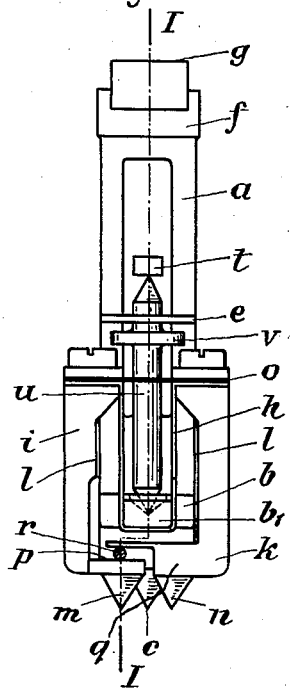

May 31, 1938.  O. DIETRICH  2,119,076

INSTRUMENT FOR MEASURING ELONGATION

Filed Aug. 23, 1934

Inventor: Otto Dietrich

Patented May 31, 1938

2,119,076

UNITED STATES PATENT OFFICE 2,119,076

INSTRUMENT FOR MEASURING ELONGATION

Otto Dietrich, Friedrichshafen, Germany, assignor to Maybach-Motorenbau G. m. b. H., Friedrichshafen, Germany Application August 23, 1934, Serial No. 741,041
In Germany September 7, 1933

16 Claims. (Cl. 33—147)

My invention relates to an instrument for ascertaining or measuring length changes in materials, and is particularly directed to a device which is adapted to be placed on the surface of the material for measuring any variation in its length. The instrument is particularly suitable for measuring small lengths such as one millimeter or less. For indicating the variations in length, two spaced measuring legs are utilized and any change in length affects the distance between the legs. Changes in spacing of the legs is indicated by means provided in the instrument for that purpose, such means being specially designed so that small variations in length of materials can be measured to a high degree of accuracy, and without errors which might arise from lost motion between moving parts.

With instruments heretofore used for measuring changes in the length of materials it has been impossible to measure materials of small length for the reason that if an instrument of the horizontal type is used it is too large for the material to be measured, and instruments of the vertical type have not been found sufficiently stable. With such instruments it has been found necessary in measuring small pieces to cement or clamp them to the surface of the material which necessitated in most cases the calibration of the instrument before the measuring operation could be carried out. It has been found difficult to cement or clamp such an instrument to surfaces which are not easily accessible, as, for example, hollow grooves of crank shafts, push rods, or the like. Moreover, in using these measuring instruments it has been necessary to test the instrument for each length variation due to the particular kind of stress which caused the variation.

By the present invention any length variations caused by stresses may be measured, since the two measuring legs are displaced laterally relative to each other. Further, this instrument has the advantage that it does not have to be tested or standardized before a measurement is taken in that it will indicate the magnitude of any length changes regardless of the cause of the change, whether it be by a pulling, bending, or torsional moment.

According to one feature of the invention, special provision is made for the application of loading pressure to the legs so as to hold the ends of the legs in engagement with the surface of the material to be measured. As more fully hereinafter explained, a construction is employed wherein the loading pressure is applied to the lower part of the device close to the surface of the material undergoing the test so as not to cause collapse or displacement of the instrument. Such pressure is transmitted to the legs through the upper ends thereof in such manner as to not impair their operating movement.

Further features of the invention involve the mounting of the measuring legs and the manner of registering their relative movement. Outstanding among such features is the provision of a supporting structure which is provided with means of support independent of the measuring legs and giving the device marked advantages over prior devices wherein the frame structure is carried entirely by the measuring legs.

In the drawing is shown one construction embodying the features of my invention.

Figure 2:
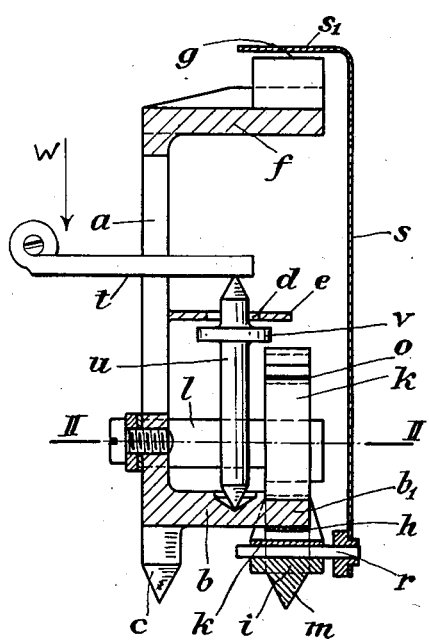
Figure 3:
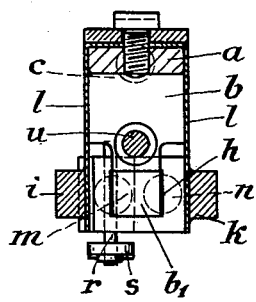

Fig. 1 shows the instrument in front elevation;
Fig. 2 is a section on line 1—1 of Fig. 1;
Fig. 3 is a section on line 2—2 of Fig. 2 drawn to a larger scale.

A frame indicated generally by $a$ is provided with a lower limb $b$ having a leg point $c$ depending therefrom, and an upper limb $f$ which carries a microscale $g$. A longitudinally slotted web portion interconnects the limb members $b$ and $f$ and has extending laterally therefrom an arm $e$ which is provided with an aperture $d$. The lower limb $b$ of the frame $a$ is provided with a reduced end portion $b_1$ which bears upon a band $h$, said band being suspended from the upper ends of two measuring legs $i$ and $k$ which are arranged opposite each other as clearly shown in Fig. 1. To the measuring legs $i$ and $k$ are fixed the free ends of band-like limbs $l$ of a sheet iron yoke, which is secured by a screw to the web portion of the member $a$ and acts to take up any slight lateral forces which might occur. The measuring legs $i$ and $k$ are provided with bearing points $m$ and $n$ which lie in the same horizontal plane with the bearing point $c$ of the limb $b$ and form together with the point $c$ a three-point support for the whole instrument. The measuring legs $i$ and $k$ are connected together at their upper ends by a flexible member $o$, for example a resilient metal strip, in such a manner that the legs can swing towards and from each other in the same plane. The lower ends of the measuring legs $i$ and $k$ are formed with horizontally extending portions $p$ and $q$ which lie in superposed relation. Between the portions $p$ and $q$ is lightly clamped a rolling member $r$ carrying a pointer $s$, which is provided at its upper end with a horizontally extending portion $s_1$ adapted to cooperate with the microscale $g$ to indicate any variation in the distance between the measuring legs. A pin $u$ is provided with a shoulder $v$ near its upper end and has its lower end bearing on the limb $b$. The upper end of the pin $u$ extends through the aperture $d$ of the arm $e$ and is prevented by the collar $v$ from becoming displaced. In order to hold the instrument on the material being tested, pressure is applied to the lower limb $b$ through the pin $u$. One way of applying the pressure may, as disclosed in Fig. 2 of the drawing, be by providing an arm $t$ which is journaled externally of the frame $a$ and which is adapted to receive a downwardly exerted pressure.

Pressure exerted upon the limb $b$ is transmitted first by the reduced end $b_1$ of the limb $b$ upon the band $h$, and then by the band $h$ to the measuring legs $i$ and $k$. Owing to this arrangement the stability of the whole measuring instrument is very high, since the pressure is exerted on the lower portion of the band $h$ which transmits the pressure to the legs through the upper ends thereof without affecting movement of the leg points. This reduces any sources of error to a minimum even when measuring extremely small pieces, which is of great importance when it is borne in mind that the measuring instrument is about twenty millimeters high, and the distance between the points $m$ and $n$ of the legs is normally about one millimeter.

The operation of the above described measuring instrument is as follows: By means of a punch provided with three centering points, corresponding to the normal position of the three points $c$, $m$ and $n$ of the measuring instrument, the measuring points $m$ and $n$ and the position of the point $c$ of the scale carrier $a$ are marked first upon the surface of the structural part to be tested, and the instrument is then placed with its points upon the marked depressions, and the pin $u$ is loaded to hold the points in the material to be tested. If, upon stressing the material to be tested, the length to be measured alters, the points $m$ and $n$, and consequently the measuring legs $i$ and $k$, are displaced accordingly. Consequently, the rolling member $r$ which is held between the surfaces of the members $p$ and $q$ is given a rolling movement and the pointer $s$ indicates a displacement which is in a certain predetermined ratio to the length of the variation to be measured. The position of the pointer may be read by means of a microscope upon the scale $g$. The point $c$ of the scale carrying member of the instrument need not necessarily be supported by the test material itself as the instrument may be used with only the measuring points supported by the test material. Owing to the three-point marking, the normal position of the instrument or its individual members with regard to the scale carrying member will always be the same.

It is not necessary to test or standardize the instrument each time before it is used, as the measuring points always initially have the same distance between them and this fixed distance, as well as the arrangement of the bands $h$ and $o$, entirely precludes any displacement of the measuring legs relative to each other prior to the beginning of the test which might falsify the measurement of the instrument. With tensile bending and torsional stresses acting upon the material being tested there will always be the same line serving as the test line and, therefore, any length change may be measured regardless of the kind of stress causing the variation.

I do not wish to be limited to the details described and shown in the drawing as many variations of my invention will become evident to those skilled in the art.

What I claim is:

1. An instrument for measuring length changes in materials comprising an upstanding stationary supporting frame, a pair of laterally spaced measuring legs upstanding beside the supporting frame and movably mounted on the frame for cooperative lateral measuring movement to and from each other, said measuring legs having lower end portions engageable with the surface of the material to be tested, and means for measuring relative movement between the measuring legs.

2. An instrument for measuring length changes in materials comprising an upstanding stationary supporting frame, a pair of laterally spaced measuring legs each movably mounted on the supporting frame for lateral movement to and from each other, lower end portions on the supporting frame and on each of the measuring legs adapted to engage the surface of the material to be measured, and and means for measuring the relative movement between the measuring legs.

3. An instrument for measuring length changes in materials comprising a frame, a pointed support for said frame, a pair of opposing measuring legs having pointed ends mounted on said frame and movable laterally relative to each other and to the frame and means for measuring the relative movement of the measuring legs.

4. An instrument for measuring length changes in materials comprising an upstanding frame, a pair of measuring legs having lower material engaging end portions and movably mounted in the supporting frame in laterally spaced relation to each other for lateral movement to and from each other, a stationary supporting leg having a lower material engaging end portion and secured to the frame at a point intermediate the measuring legs and laterally offset from a line extending between said legs, and means for measuring the relative movement of the measuring legs.

5. An instrument for measuring length changes in materials including a frame, a pair of measuring legs carried by the frame and hinged at their upper portions for swinging movement relative to each other, pointed lower ends on the measuring legs adapted to be pressed against the surface of the material to be measured, spaced pressure transmitting members extending downwardly one adjacent each of the measuring legs and secured to and suspended from the upper portions of said legs, and means adapted to receive a loading pressure connecting with the lower ends of said transmitting members and operable therethrough and through the upper portions of the measuring legs to apply loading pressure on the lower material engaging ends of the legs, and means for measuring the relative movement of the lower ends of the measuring legs.

6. An instrument for measuring length changes in materials including a frame, a pair of measuring legs mounted on the frame for movement relative to each other and having pointed lower ends adapted to be pressed against the surface of the material to be measured, means for transmitting loading pressure to the legs secured to and suspended from the upper portions of the respective legs and having a depending pressure receiving portion positioned opposite the lower portions of said legs, and means for measuring the relative movement of the lower ends of the measuring legs.

7. An instrument for measuring length changes in materials including a frame, a pair of measuring legs mounted on the frame for movement relative to each other and having pointed lower ends adapted to be pressed against the surface of the material to be measured, means for transmitting loading pressure to the legs comprising a flexible band secured at its ends to the upper portions of the respective legs and having a depending intermediate portion adapted to receive the loading pressure located intermediate the upper and lower ends of the legs, and means for measuring the relative movement of the lower ends of the measuring legs.

8. An instrument for measuring length changes in materials, including a frame, two pointed legs adapted to be pressed on the surface of the material to be tested supported on the frame for movement relative to each other, pressure transmitting means connecting with the upper portions of the respective legs and having a lower portion depending below said upper leg portions, means for exerting a loading pressure on said lower portion of the pressure transmitting means to be transmitted to the leg points through the upper ends of the legs, and means for measuring the relative movement of said legs.

9. An instrument for measuring length changes in materials including a pair of spaced upstanding legs having narrow lower ends adapted to engage material to be tested, means connecting the upper ends of said legs to permit the lower ends of the legs to move towards and from each other, means adapted to transmit a loading pressure secured to the upper ends of the respective legs and depending therefrom, said means transmitting the pressure through the upper ends of said legs to hold the narrow lower end portions in the material to be tested.

10. An instrument for measuring length changes in materials including spaced apart measuring legs having pointed lower ends adapted to be pressed on material to be tested, means connecting the upper ends of said legs and permitting relative movement of the pointed ends, a substantially U-shaped member depending between the legs and suspended from the upper ends of said legs adapted to receive a loading pressure on its lower portion, which pressure acts through the upper ends of said legs to hold said pointed ends in the material to be tested, and means for measuring the relative movement of said legs.

11. An instrument for measuring length changes in materials including a frame having a narrow lower end, a pair of spaced measuring legs terminating in narrow lower ends adapted to rest on material to be tested, said legs being mounted on the frame for movement relative to each other, means adapted to transmit a loading pressure positioned adjacent the lower ends of the legs and individually connecting with the legs through the respective upper ends of the legs, said means transmitting the pressure through the upper ends of said legs to fix the narrow legs in the material to be tested.

12. An instrument for measuring length changes in materials including an upstanding frame having a pointed lower supporting end, a pair of upstanding legs having pointed lower ends movably mounted in the frame for lateral movement to and from each other, pressure transmitting means adapted to apply loading pressure simultaneously on the points of the laterally movable legs and the frame, said pressure transmitting means connecting with the legs through the upper ends thereof.

13. In an instrument for measuring length changes in materials, a stationary frame, a pair of upstanding laterally spaced rigid legs having pointed lower ends, each leg supported in the frame for lateral movement relative to the frame, a flexible strip connecting the upper portions of said legs and permitting the lower pointed ends thereof to move laterally to and from each other, and means for measuring the relative movement of the points of said legs.

14. An instrument for measuring length changes in materials including a supporting frame, a pair of upstanding spaced rigid measuring legs supported for movement in the frame and having pointed lower ends, a flexible strip connecting the upper ends of said legs to permit the lower ends thereof to move to and from each other, lateral extensions on said legs adjacent the lower ends thereof and lying in superposed relation, a rolling member located between and rotatable by the opposing surfaces upon relative movement of said legs, and means operable by said rolling member to measure the relative movement of the legs.

15. An instrument for measuring length changes in materials including an upstanding supporting frame, a pair of spaced apart measuring legs having lower material engaging ends, means independent of the frame interconnecting the upper ends of the measuring legs and adapted to permit relative movement of the legs, supporting means on the frame connecting with the legs at an intermediate portion of their length and providing for hinging movement of the legs relative to the frame, and means for measuring the relative movement of the lower ends of the measuring legs.

16. An instrument for measuring length changes in materials including an upstanding frame having a material engaging lower end, a pair of spaced apart measuring legs having lower material engaging ends, a flexible strip interconnecting the upper ends of the measuring legs and providing for relative movement of the lower ends of the legs, supporting means supporting the legs on the frame, means through which pressure may be applied to hold the legs in engagement with the material to be tested comprising a U-shaped flexible strap depending between the legs having a lower portion adapted to receive pressure and having its ends connected to the upper portions of the respective legs so that pressure exerted on the strip will be transmitted to and applied through the upper portions of the legs without interfering with movement of the lower ends of the legs under changes in length of the test material, and means for measuring relative movement of the lower ends of the legs.

OTTO DIETRICH.